United States Patent
Rerolle et al.

[15] 3,657,042
[45] Apr. 18, 1972

[54] PROCESS FOR MANUFACTURE OF LAMINATED SECTIONS

[72] Inventors: Marc Rerolle; Jean Besson, both of Lyon, France

[73] Assignee: Seprosy Societe Europeenne Pour la Transformation de Produits de Synthese, Paris, France

[22] Filed: Jan. 7, 1969

[21] Appl. No.: 789,488

[30] Foreign Application Priority Data

Jan. 24, 1968    France......................................49563

[52] U.S. Cl..............................156/190, 156/191, 156/192
[51] Int. Cl...........................................................B31c 9/00
[58] Field of Search................156/184, 187, 185, 188, 192, 156/191, 190; 220/5

[56] References Cited

UNITED STATES PATENTS

| | | | |
|---|---|---|---|
| 2,997,931 | 8/1961 | Elam | 156/195 X |
| 3,195,427 | 8/1965 | Adams | 156/195 X |
| 3,228,308 | 1/1966 | Denenberg | 156/195 X |
| 3,247,869 | 4/1966 | Boegershausen et al | 156/195 X |
| 3,300,356 | 1/1967 | Warnken et al | 156/195 X |
| 3,385,179 | 5/1968 | Roe | 156/195 X |
| 3,457,130 | 7/1969 | Morrison | 156/195 X |
| 3,399,095 | 8/1968 | Hyland | 156/195 X |
| 2,393,347 | 1/1946 | Stuart et al. | 93/39.1 |
| 3,449,183 | 6/1969 | Zelnick | 156/306 X |
| 3,490,972 | 1/1970 | Rogers | 156/306 X |
| 3,037,529 | 6/1962 | Hancik | 156/190 X |
| 2,681,702 | 6/1954 | Kuenn et al | 164/17 |

Primary Examiner—Carl D. Quarforth
Assistant Examiner—Gary G. Solyst
Attorney—Waters, Roditi & Schwartz

[57] ABSTRACT

Laminated sections are made by winding a sheet of paper or fabric and a plastics film on to a mandrel in the cold, without any addition. The first and last turns or the spool may be of plastics film alone. Unwinding may be prevented by an adhesive strip on the last turn. The spool after winding is removed and heated at any later time to fuse the plastics film and bond the layers together. A label may be sealed under the last layer of film. A packaging container is made from the section by crimping a disc of similar laminated material on the bottom of the section and heating to ensure liquid-tightness.

2 Claims, 7 Drawing Figures

PATENTED APR 18 1972 3,657,042
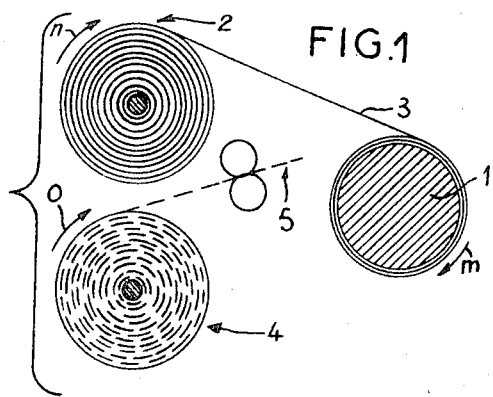
FIG.1
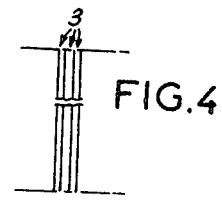
FIG.4
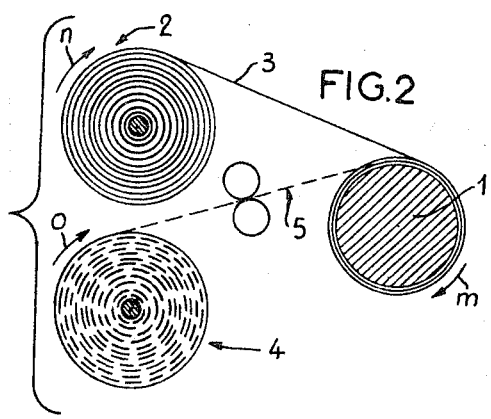
FIG.2
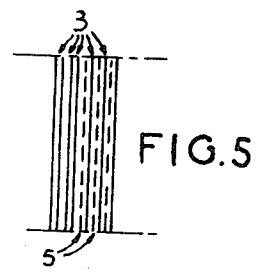
FIG.5
FIG.6
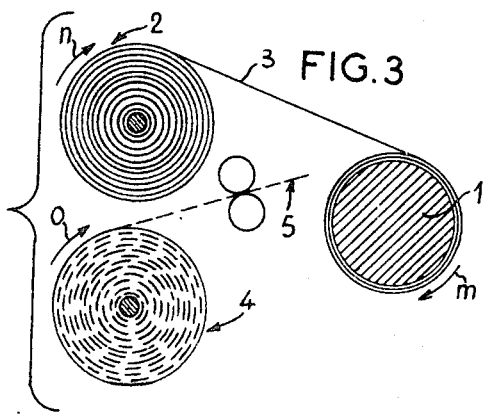
FIG.3
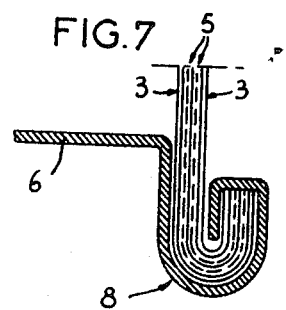
FIG.7

PROCESS FOR MANUFACTURE OF LAMINATED SECTIONS

The present invention relates to a process for the manufacture of laminated sections.

It is known that drums, cylinders, or spools can be obtained directly by winding upon itself a sheet such as paper covered with an adhesive product, with a glue or with a resin solution.

After drying by evaporation of the solvent a section or rigid body is obtained. Although this is useful this method of manufacture necessitates thus the intervention of a glue or other adherent product with, consequently, evaporation of the solvent. Furthermore, the inner surface of the body or section is not completely impermeable and it is noticed that after manufacture there is a considerable pick up of humidity.

Furthermore complexes or laminates have been produced by application upon one another of sheets or films in such a way that the final complex resulting therefrom might be provisionally rolled upon itself into a spool until the time of its final utilization without sticking occuring between themselves of the various layers of the spool and this being in order to allow unwinding.

Cylindrical laminated materials have also been made by winding upon a former a plastics film or a complex constituted by sheets of paper covered with thermoplastic material and by rolling this former on a table of which a part is heated to cause welding between the different superposed layers of the spool.

There has also been considered according to a technique similar to the preceding one, winding a textile material on a former with interposition of lacquer gum and proceeding by not calendering of this assembly upon the same winding machine.

It is an object of the present invention to provide a process to enable the direct constitution of a full or hollow laminated section.

Another object is to provide an improved process for manufacturing a packaging container.

Other objects and advantages of the invention will emerge from the description which follows.

The process according to the invention consists essentially in placing several layers one upon the other by winding or superposition of a sheet of paper, of fabric, or of other material of commerce and of a film of plastics material, also commercial, this winding or superposition being effected directly in the cold and without any other addition, upon a former having the dimensions of the section to be produced, this winding or superposition being, only after formation, and at any time, borne into a separate enclosure at a temperature such that there is a fusion of the film of plastics material, and, due to this fact, intimate welding between themselves of the various constituent layers.

The aforesaid thermal treatment which thus occurs at any time after the formation of the spool or stack is effected by any suitable and independent means such as in an oven or an autoclave, so that the winding machine does not have any heating element which enables a much greater production rate. This high production rate results also from the absence of any glue or solvent to evaporate and of any need for a cooling period on the winding machine.

Another very considerable advantage which is bestowed by the method according to the present invention resides in the fact that, in the case of a hollow section which has to constitute a wrapping impervious to liquids, one or more of the first turns of the winding on the former are effected solely with the film of plastics material, and the paper, fabric or other material is incorporated only in the subsequent layers following a number of turns corresponding to the resistance required, terminating this winding by at least one layer of film of plastics material, if it is desired that the outer surface of the section be itself smooth, impervious and unsoilable. The winding maintained by one or several turns of a material other than the paper constituting the body and possessing an inner surface identical with that which it is desired to obtain on the outside of the section.

In this case a label or any other advertising matter can also be incorporated beneath the last or one of the last layers of film.

The temperature of the heat treatment which is carried out subsequently and separately must be sufficient to lead to the fusion of the plastics film, this temperature being of the order to 130° C. in the case of a film of a polyolefine such as polythene or polypropylene and the duration of this thermal treatment is itself variable as a function of the nature of this same film.

It is thus possible to make directly starting from sheets of simple and separate materials, which are used in commerce, a section, such as a wrapping which does not require the intervention of glue any more than of resin or of lacquer gum and does not involve any release of vapor nor of solvent odor.

These sections or wrappings have furthermore the advantage of not involving any take up of humidity.

In the case of constituting a package, the body of the latter, made as indicated above, is assembled with one or two bottoms including the accessories necessary for filling and/or emptying.

These bottoms can be constituted by discs of plastics material alternated with discs of paper, fabric or other material stacked and heated in the same conditions as for the body but exerting upon them a pressure which ensures their intimate contact.

This or these bottoms are then force-fitted into the two ends of the previously prepared body and this assembly fixed by stapling, crimping, or other means, is placed in the previously used heated enclosure, thus making an absolutely impermeable and hydrophobic package. This latter treatment is not obligatory in the case of crimping especially, if the impermeability obtained thereby is sufficient.

In order that the invention may be more fully understood one embodiment of the process according to the invention is described below purely by way of illustrative but non-limiting example with reference to the accompanying schematic drawing showing the obtaining of a package with a cylindrical body with inner and outer walls impervious to liquids.

In the drawing:

FIGS. 1, 2 and 3 represent the successive phases of the formation of this package;

FIGS. 4, 5 and 6 represent on a larger scale the cross-section of the spools at the stages of FIGS. 1, 2 and 3 respectively; and FIG. 7 represents in partial cross-section, the package of FIGS. 1 to 6, furnished with a bottom.

There is provided for carrying out the process, a forming mandrel 1 capable of being brought on command into rotation in the direction of the arrow $m$; a spool 2 of sheet plastics material 3, and a spool 4 of paper, fabric or other sheet material 5.

These two spools 2 and 4 are driven in rotation in the direction of the arrows $n$ and $o$ by the effect of the traction exerted upon their respective sheet 3 and 5.

The rotation of these spools is not free, but is braked by any suitable means not shown in the drawing.

The first phase of the process consists in putting into rotation the mandrel 1 and winding upon it at least one layer of a sheet of plastics material 3 (FIGS. 1 and 4).

The second phase consists of continuing this winding by superposing the two sheets 3 and 4 (FIGS. 2 and 5).

When the superposition of more or less of these layers gives the required mechanical strength, the third phase consists of terminating the winding by at least one layer of the sheet of plastics material along 3, (FIGS. 3 and 6).

To avoid it unwinding the last turn of the sheet of plastics material is fixed by a glued band.

When this spool is finished, it is lifted up from the machine with its mandrel and subjected to the aforesaid heat treatment at any subsequent time and in any suitable heated enclosure.

If it relates to a package which has to comprise one or two bottoms 6, each of them is constituted by the superposition of discs respectively of plastics material and of paper, fabric or other material, these discs being stacked, pressed against one another and heated as for the body itself.

When the body of the package has undergone its heat treatment and the mandrel has been extracted from it, the one or more bottoms can be placed upon it by any suitable means, such as crimping at 8 as shown in FIG. 7.

It will be apparent that various changes and modifications may be made in the embodiments described without departing from the essential concept of the invention as defined in scope by the appended claims.

We claim:

1. A process for the manufacture of laminated sections of hollow configuration particularly for the production of liquid impervious packages, said process comprising the steps of superimposing a commercial sheet material and a film of plastic material to cold form a plurality of layers to thereby constitute a multilayered member in the absence of an adhesive additive having predetermined cross-sectional dimensions, transferring said multilayered member subsequent to cold forming into a separate enclosure and imparting an elevated temperature to effect fusion of said film so as to fuse said layers to each other and to thereby provide an integrally laminated section, said multilayered section being positioned about a mandrel and said cold forming comprising winding said plastic film and sheet material thereon to form a spool, forming at least the first one of the initial winding turns on said mandrel with the film of plastics material, and including said sheet material on said mandrel in subsequent winding layers.

2. A process as claimed in claim 1, wherein the final winding on said mandrel comprises solely a layer of plastic film material.

* * * * *